Sept. 27, 1949.  F. T. ROBERTS  2,483,234
METHOD OF MAKING HOLLOW RUBBER ARTICLES
Filed Aug. 11, 1945  3 Sheets-Sheet 1
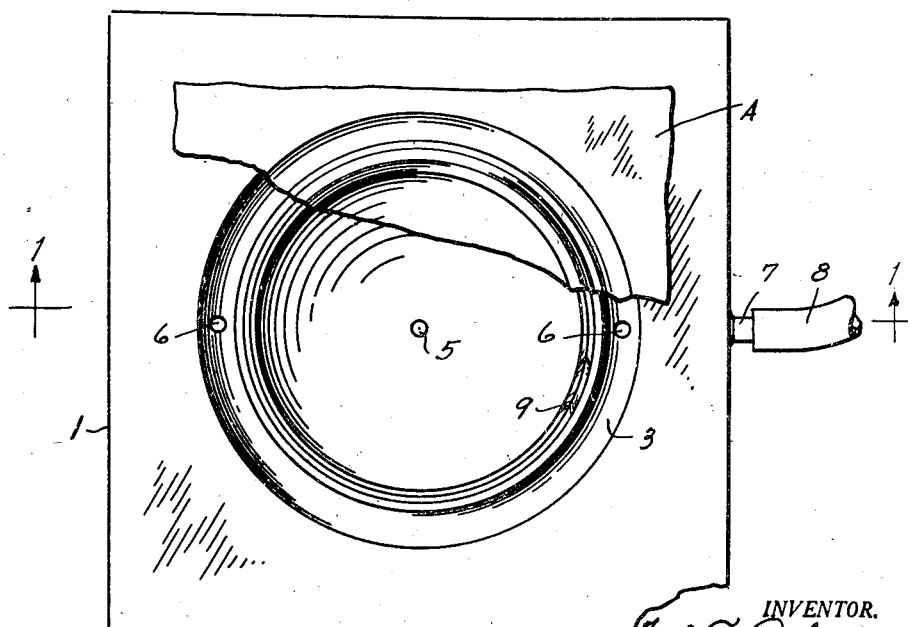

Sept. 27, 1949.  F. T. ROBERTS  2,483,234
METHOD OF MAKING HOLLOW RUBBER ARTICLES
Filed Aug. 11, 1945  3 Sheets-Sheet 2

INVENTOR.
Fred T. Roberts
BY
Bates, Teare & McKee
Attorneys

Sept. 27, 1949.　　　　F. T. ROBERTS　　　　2,483,234
METHOD OF MAKING HOLLOW RUBBER ARTICLES
Filed Aug. 11, 1945　　　　　　　　　　　　3 Sheets-Sheet 3

INVENTOR.
Fred T. Roberts
BY
Dalis, Teare & McBean,
Attorneys.

Patented Sept. 27, 1949

2,483,234

UNITED STATES PATENT OFFICE 2,483,234

METHOD OF MAKING HOLLOW RUBBER ARTICLES

Fred Thomas Roberts, Ridgefield, Conn.

Application August 11, 1945, Serial No. 610,251

11 Claims. (Cl. 154—16)

This invention relates to the manufacture of hollow balls having walls of multiple plies of sheet material. The invention is well suited for the manufacture of hollow balls or bladders suitable for use in basketballs or footballs, such ball or bladder being provided with a valve through which it may be inflated for use. The method, however, may be employed advantageously in the manufacture of large toy balls or playing balls of various sorts.

An object of the invention is to provide for the rapid and economical surmounting of one layer of rubber or other vulcanizable material upon a previously formed ball and effectively securing such surmounting layer in place. Another object is to so form the first ball and so apply the subsequent layer or layers of vulcanizable material thereto that the seams of the successive layers will be disposed in equalized crossing relation, thus making a very strong ball. A further object is to enable the production of a ball having successive layers of different characters of material, each selected with reference to the duty it is to perform.

My method and apparatus and the results accomplished thereby will be more fully explained in connection with the accompanying drawings, which show a preferred form of apparatus and illustrate the method.

Figure 3:
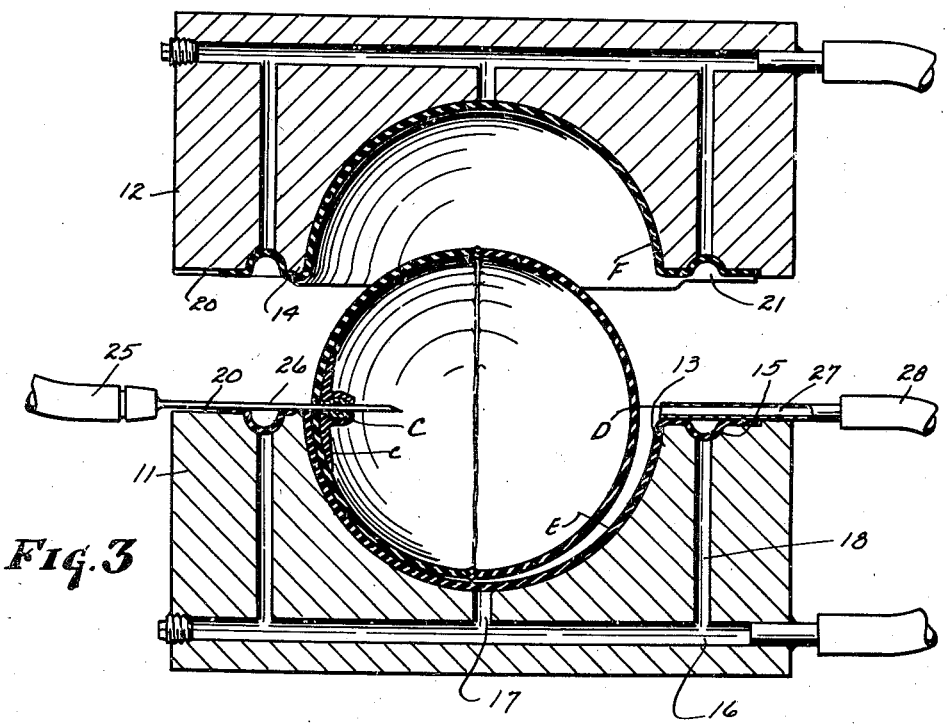
Figure 5:
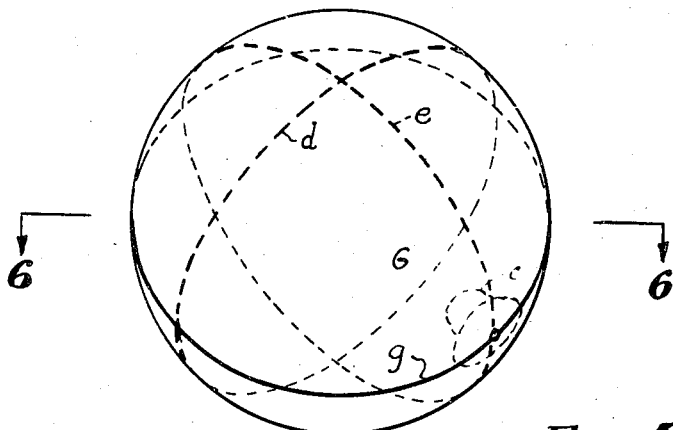
Figure 6:
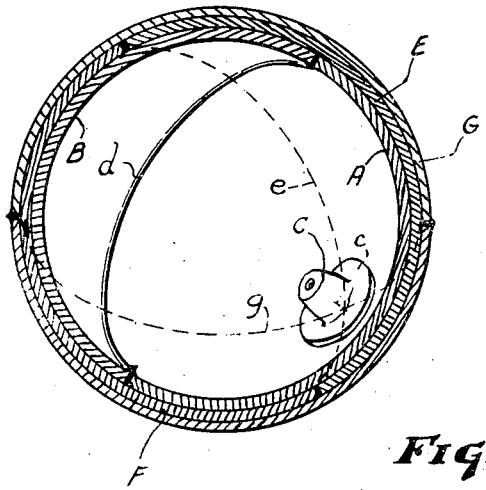

In the drawings, Fig. 1 is a separated vertical section through two mold members for performing one of the operations of my method, the plane of the section being indicated by the line 1—1 on Fig. 2; Fig. 2 is a plan of the lower mold section shown in Fig. 1; Fig. 3 is a separated vertical section of a pair of mold members for performing another operation in the manufacture of the ball and indicating the inner ball in position and certain tubes also in position, the plane of the section being indicated by the line 3—3 in Fig. 4; Fig. 5 is a view of the completed ball, showing 3 crossing seams. Fig. 6 is a cross section in a diametric plane indicated by the line 6—6 on Fig. 5.

In the manufacture of the composite ball by my method I first produce in any suitable manner a ball equipped with a self-sealing plug whereby it may be inflated by the insertion of a hollow needle. I may make such a ball if desired by the apparatus shown in Fig. 1. In this figure, 1 and 2 represent two cooperating mold members each having a cavity, shown as a hemisphere. At the edge of the mold cavity is formed in each mold member an annular rib 9 V-shaped in cross section. Surrounding the cavity in each mold member is an annular groove 3. Beyond the cavity in each mold member is a transverse passageway 4 connected by a passageway 5 with the cavity and by other passageways 6 with the groove 3. I mount in the entrance to the passageway 4, a nipple 7 to which is connected a suction tube 8 leading to the source of vacuum.

In forming a ball by the apparatus just described, a sheet of raw rubber A is laid across each mold member and suction is applied to the conduit 8 for exhausting air from the vacuum groove and from the main cavity 4. The vacuum groove is comparatively shallow and the action is to clamp the margin of the sheet about the cavity immediately at the groove, then the continued exhaustion of air draws the rubber sheet down into the cavity, as shown in the case of the two sheets A and B in Fig. 1.

In one of the seated rubber sheets at the base of the cavity I cement a plug of rubber C. This plug may be merely self-sealing rubber similar to the para rubber plugs formerly employed in inflatable balls or it may be a plug already slitted, or one provided with an internal self-closing valve. As indicated, it has an annular flange C cemented to the interior of the ball wall.

After the plug has been applied to one of the seated rubber sheets, the two mold members are brought together and thereupon the two annular ribs coact to pinch the rubber and form a diametric seam at the junction, the external rubber fin being at the same time cut off. This gives me a completed ball containing air under atmospheric pressure. I then release the vacuum and separate the molds and remove the completed ball.

While the apparatus described is very satisfactory for the formation of the ball, and enables the very ready mounting of the valve in its interior, other apparatus, may, if desired, be employed for forming this ball.

I now take the apparatus illustrated in Fig. 3 comprising two mold members 11 and 12, each having a hemispheric cavity 13, each cavity having about it at the edge a raised rib 14 providing a cutting edge and there being a vacuum groove 15 surrounding the cutting edge, and an exhausting conduit 16 beyond the cavity connected by passageways 17 and 18 with the cavity and the vacuum groove.

Figure 4:
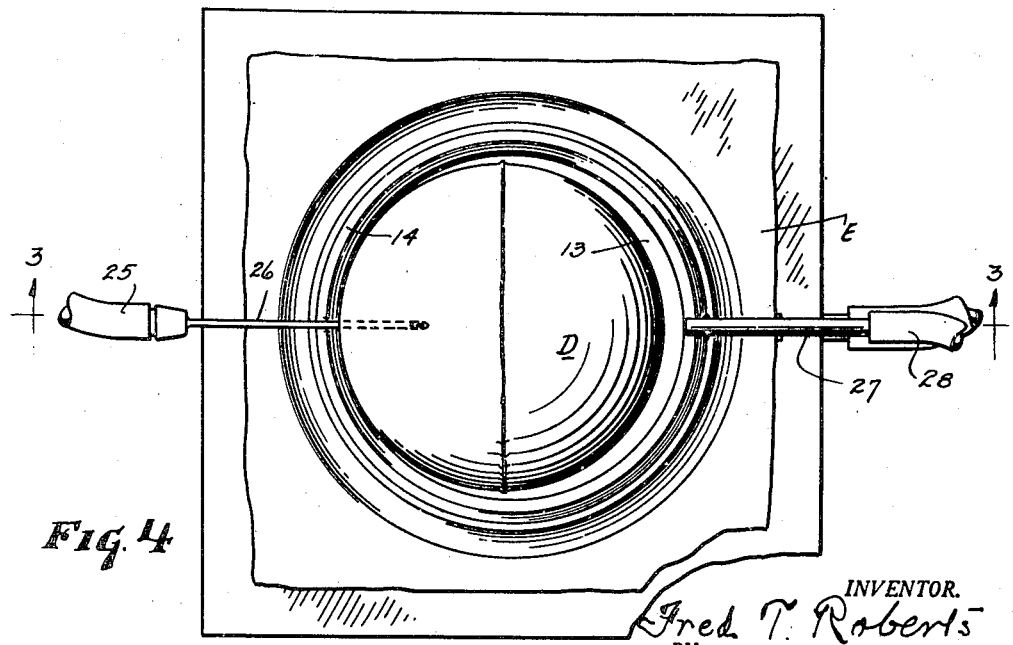

The construction of the mold members of Figs. 3 and 4 so far described is substantially identical with the molds shown in Figs. 1 and 2, with the exception that the mold cavities are of slightly larger radius. However, in these second mold members I form semi-cylindrical radial grooves 20 and 21 in the faces of the mold members for a purpose about to be described.

I now place sheets of raw rubber across the mold cavities 13 and exhaust the air from the vacuum grooves and from the cavities and seat such rubber therein, producing hemispheres of rubber with peripheral flanges at the edges as indicated at E and F.

I now take the original ball, which may have been formed by the apparatus of Fig. 1, take a tube or conduit, terminating in a hollow needle and pass the needle through the valve plug of the ball so that pressure may be admitted to the interior. Such a ball is shown at D in Fig. 3, the conduit being indicated at 25 with its needle pushed in at 26 and acting as a valve stem. In this figure I have exaggerated the space between the ball D and the rubber lining of the cavity for clearness of illustration.

The ball D is covered with cement and placed in the rubber lined cavity of the lower mold member 11 with the needle occupying the groove 20. I likewise place another tube 27 in the diametrically opposite recess 21, as shown in Fig. 3, this latter tube being connected to a conduit 28 to which suction may be applied.

I now bring the mold members 11 and 12 together, forming a diametric seam at the two raised ribs and embedding the two tubes 26 and 27 in the rubber flanges, the remainder of these flanges being pinched off externally of the seam as the two halves are joined.

After the mold members are brought together I connect a source of compressed air to the tube 25 and a source of vacuum to the tube 28 and simultaneously supply compressed air to the interior of the ball D to expand it while exhausting the air from the space between the ball and the rubber lining. The result of this is that the ball becomes firmly seated against the two rubber linings and effectively joined thereto. Thereafter I release the compressed air and the vacuum and open the molds and thus have a completed ball of two layers with the seams crossing each other, the outer seam at least being in an equatorial region.

If desired the forming operation may stop with the two-layer ball, produced as just described. Thereafter such a ball is placed in a suitable vulcanizing mold having two coacting spherical cavities and vulcanized by heat, or it may be submitted to other vulcanization either with or without a vulcanizing mold. After vulcanization the operation has produced a complete two-layer ball ready at any time to be deflated for packing, if desired, and inflated for use by the application of the hollow needle through the valve stem.

In place of stopping with the two-layer ball, I prefer, however, to apply a third layer. This is done by an apparatus exactly like that of Fig. 3, except that the cavities are slightly larger. The sheet material for the third layer is placed across such mold cavities, the air exhausted, the two-layer ball put in place in the lower mold member with the compressed air tube and vacuum tube in place. Care is taken in placing this two-layer ball (the exterior of which is covered with cement) to cause the equatorial seam about to be formed by the third layer to cross the seam to the second layer perpendicularly. That is to say, the two-layer ball is as illustrated by the ball D in Fig. 3, except that it has been rotated a quarter of a turn about the axis of the valve stem and exhausting pipe and thus the newly formed seam is at right angles to the seam of the underlying second layer.

After the cemented covered ball has been placed in the rubber-lined cavities for the outer layer, compressed air is supplied to the interior of the ball through the valve stem pipe, the middle of which passes through the second layer and the plug of the inner ball. At the same time the air is exhausted between the second layer and the rubber lined cavities through the vacuum pipe, at the junction of the two mold members.

After the third layer has been joined about the ball in the operation just described, the compressed air and vacuum is released and the mold members are opened and the complete three-layer ball is removed and thereafter receives its final vulcanization in a mold or otherwise as desired.

It will be seen that if the first ball is made by the apparatus of Fig. 1, it comprises two cup-shaped halves joined by an equatorial seam. Then the apparatus of Fig. 3 applies the second layer joined by an equatorial seam, which is a great circle crossing the first seam at right angles. Now the application of the third layer has just been described and produces a third equatorial seam which crosses the other two seams at right angles, thus giving a symmetrically formed ball, as illustrated at G in Fig. 6, having one visible equatorial seam g and two invisible equatorial seams e and d all equally spaced.

In the vacuum sealing operations, as the rubber sinks into the hemispherical cavities it may become somewhat thinner adjacent the diameter than it is adjacent the pole, but when several layers are employed, arranged as described, the thinner portion of one layer joins the thicker portion of another, resulting in a wall of a thickness which is for practical purposes substantially uniform throughout.

An advantage of my multiple layer ball is that the respective layers may be selected of different materials, each best suited to meet one of the requirements encountered in practice without having to compromise between what is best for different requirements as in the case of a single layer ball. The material will differ with balls for different uses, but as an illustration, in the manufacture of a ball for use as a soccer ball, I may make the inner layer, that is the original ball, of material characterized by extreme imperviousness. I may choose for the second layer material having a high resisting quality to blows, and for the outer layer material best suited for resisting abrasion.

I claim:

1. The method of securing a second layer over a ball comprising placing the ball within the layer, withdrawing the air by suction from between the ball and layer and applying fluid pressure to the interior of the ball to press it against the cover.

2. The method of securing a second layer over a ball having an inflating valve comprising placing the ball within the layer, and applying fluid pressure to the interior of the ball through the valve to press it against the cover while withdrawing the air between the ball and cover by suction.

3. The method of making multiple layer balls comprising taking a ball for the inner layer, seating sheet material for a second layer in a pair of coacting cavitary molds, placing the ball within one of the lined cavities, bringing the mold members together, supplying fluid under pressure to the interior of the original ball and exhausting the air from the space between the ball and the second layer.

4. The method of making multiple layer balls comprising lining mold cavities with vulcanizable material, placing a previously formed ball in one of the lined cavities, applying cement in position to coact with the exterior of the ball and the interior of the cavity lining, and bringing the mold members together and to form a seam joining the linings, and exhausting the air between the lined cavities and the previously formed ball and expanding said previously formed ball.

5. The method of making multiple layer inflatable balls comprising placing sheets of vulcanizable rubber across the mouths of a pair of mold cavities, exhausting the cavities to seat the rubber therein, placing in one of the lined cavities a previously formed hollow ball, bringing the mold members together to join the two seated portions and form an equatorial seam producing a second layer, exhausting the air between said second layer and the previously formed ball in place thereof and at the same time inflating the previously formed ball, and thereafter vulcanizing the product to join the layers firmly to each other.

6. The method of making multiple layer balls comprising seating sheets of flexible impervious material in a pair of coacting cavitary molds, taking a previously formed ball, inserting a valve stem into such ball, placing the ball in one of the lined cavities with the valve stem extending therefrom, providing a conduit to exhaust the air from the space between the original ball and lining, bringing the mold members together to join said linings, then supplying compressed fluid through the valve stem into the interior of the inner ball and exhausting the air through the exhausting conduit from between the ball and lining.

7. The method of making hollow balls having multiple layer walls comprising seating material for a second layer in cavities of a pair of coacting molds, taking a previously formed ball having an external seam and a self-closing internal plug, inserting a hollow inflating needle from the exterior into the plug, placing such ball in one of the lined cavities, bringing the mold members together to form an equatorial seam on the second layer out of registration with any seam in the ball, supplying air to the inner ball through the hollow needle and exhausting the air from between the ball and the seated material, whereby the ball becomes joined to the seated material and the latter is joined to form an equatorial seam about the ball.

8. The method of making multiple layer balls comprising placing two sheets of rubber-like material across two cavitary molds, exhausting the air from the cavities to seat the material therein, applying a valve plug to the interior of one of the seated sections of material at a pole thereof, bringing the mold members together to join two seated sections into a ball by a seam at the equator, seating sheets of material for a second layer in cavities in a second mold which cavities are somewhat larger than the cavities first mentioned, inserting an inflating needle in the valve plug of the ball, placing the ball in the material seated in one of the second cavities, and bringing the second mold members together, inflating the ball through the hollow needle and exhausting the air from between the ball and the lined cavities.

9. The method of making multiple layer balls comprising forming a hollow ball of flexible material characterized by a wall of high impermeability, placing such ball in lined coacting cavities of a mold, the lining comprising material having a high characteristic of strength, bringing the mold members together, inflating the ball and exhausting the air between the ball and lining.

10. The method of making multiple layer balls comprising forming a ball of vulcanizable material having one characteristic, seating such ball in lined coacting cavities of a mold, the lining comprising vulcanizable material having a different characteristic, bringing the mold members together, inflating the ball and exhausting the air between the ball and lining, seating in another pair of coacting cavities material having a characteristic different from either of the other two layers, bringing the latter cavities together, exhausing the air between the second and third layers, and vulcanizing the product.

11. The method of making a multiple layer ball comprising taking a ball having an internal valve plug, seating a hollow needle in said plug, placing sheets of material for a second layer across cavitary molds, exhausting the air from such molds to seat the material therein, the cavities being large enough so that when lined they may receive said ball, placing the ball in one of the cavities with cement between the ball and lining and with the hollow needle extending between the molds, placing an exhausting tube in position to lie between the molds, bringing the mold members together, supplying compressed air to the ball while exhausting air from the space between the ball and lining, pinching off the excess material at the junction of the two halves of the lining thereby forming an equatorial seam, then placing such covered ball in one of two other molds each having a cavity larger than the cavity first-mentioned and lined with material, there being cement between the covered ball and such seated material and the covered ball having its seam crossing the plane defining the face of the cavity, bringing the latter molds together to form a third layer about the second layer, cutting off the excess material about the junction, supplying compressed air to the interior ball through the hollow needle and exhausting air from the space between the second layer and the seated material for a third layer, and then relieving the vacuum and the compressed air, opening the mold and removing the three-layer ball.

FRED THOMAS ROBERTS.

REFERENCES CITED

The following references are of record in the file of this patent:

UNITED STATES PATENTS

| Number | Name | Date |
| --- | --- | --- |
| 701,766 | Richards | June 3, 1902 |
| 1,387,805 | Roberts | Aug. 16, 1921 |
| 2,213,479 | Voit et al. | Sept. 3, 1940 |
| 2,221,534 | Voit et al. | Nov. 12, 1940 |
| 2,309,865 | Reach | Feb. 2, 1943 |